(12) United States Patent
Sai

(10) Patent No.: US 11,090,908 B2
(45) Date of Patent: Aug. 17, 2021

(54) METAL MEMBER, METHOD FOR PRODUCING METAL MEMBER, METAL-RESIN JOINED BODY AND METHOD FOR PRODUCING METAL-RESIN JOINED BODY

(71) Applicant: Mutsuki Electric Co., Ltd., Osaka (JP)

(72) Inventor: Seiichi Sai, Osaka (JP)

(73) Assignee: MUTSUKI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/610,980

(22) PCT Filed: Nov. 16, 2017

(86) PCT No.: PCT/JP2017/041252
§ 371 (c)(1),
(2) Date: Nov. 5, 2019

(87) PCT Pub. No.: WO2019/097624
PCT Pub. Date: May 23, 2019

(65) Prior Publication Data
US 2020/0070477 A1    Mar. 5, 2020

(51) Int. Cl.
*B32B 3/00* (2006.01)
*B32B 15/08* (2006.01)
(Continued)

(52) U.S. Cl.
CPC .............. *B32B 15/08* (2013.01); *B29C 45/14* (2013.01); *B32B 15/085* (2013.01); *B32B 15/18* (2013.01);
(Continued)

(58) Field of Classification Search
None
See application file for complete search history.

(56) References Cited

U.S. PATENT DOCUMENTS

| | | | |
|---|---|---|---|
| 2014/0234631 A1* | 8/2014 | Iino | B29C 65/8246 428/412 |
| 2014/0349137 A1* | 11/2014 | Brandl | C22F 1/057 428/687 |
| 2018/0264696 A1 | 9/2018 | Umemoto et al. | |

FOREIGN PATENT DOCUMENTS

| | | |
|---|---|---|
| EP | 2 762 289 A1 | 8/2014 |
| EP | 3 674 080 A1 | 7/2020 |

(Continued)

OTHER PUBLICATIONS

International Search Report dated Dec. 26, 2017, issued in counterpart International Application No. PCT/JP2017/041252, with English translation (2 page).
(Continued)

*Primary Examiner* — Seth Dumbris
(74) *Attorney, Agent, or Firm* — Westerman, Hattori, Daniels & Adrian, LLP

(57) ABSTRACT

A surface of a metal substrate formed from a metal is heated, an oxide film is formed on the surface of the metal substrate, at least a portion of the oxide film is heated so as to increase a joining strength of the oxide film to the metal substrate, subsequently a synthetic resin substrate formed from a synthetic resin is joined to the oxide film, and thus a metal-resin joined body is obtained. Thereby, a metal-resin joined body having high joining strength is obtained.

6 Claims, 9 Drawing Sheets

(51) Int. Cl.
    *B29C 45/14*     (2006.01)
    *B32B 15/085*     (2006.01)
    *B32B 15/18*     (2006.01)
    *B32B 15/20*     (2006.01)
    *C23C 8/02*     (2006.01)
    *C23C 8/10*     (2006.01)
    *B29K 705/00*     (2006.01)

(52) U.S. Cl.
    CPC ............... *B32B 15/20* (2013.01); *C23C 8/02* (2013.01); *C23C 8/10* (2013.01); *B29K 2705/00* (2013.01); *B32B 2255/06* (2013.01); *B32B 2255/205* (2013.01); *Y10T 428/24917* (2015.01)

(56) References Cited

FOREIGN PATENT DOCUMENTS

| | | |
|---|---|---|
| JP | 6-212451 A | 8/1994 |
| JP | 2013-227599 A | 11/2013 |
| JP | 2014-60138 A | 4/2014 |
| JP | 2014-111816 A | 6/2014 |
| JP | 2015-166188 A | 9/2015 |
| JP | 2017-056736 A | 3/2017 |
| WO | WO-2007072603 A1 * 6/2007 ............. B23K 26/32 |
| WO | WO-2013049081 A2 * 4/2013 ............. C25D 11/16 |
| WO | 2014/157289 A1 | 10/2014 |
| WO | 2017/065256 A1 | 4/2017 |

OTHER PUBLICATIONS

Extended European Search Report dated Sep. 1, 2020, issued in EP Patent Application No. 17932457.9. (7 pages).

Office Action dated Apr. 28, 2021, issued in counterpart JP Application No. 2019-554109, with English Translation. (6 pages).

* cited by examiner

[FIG. 1]
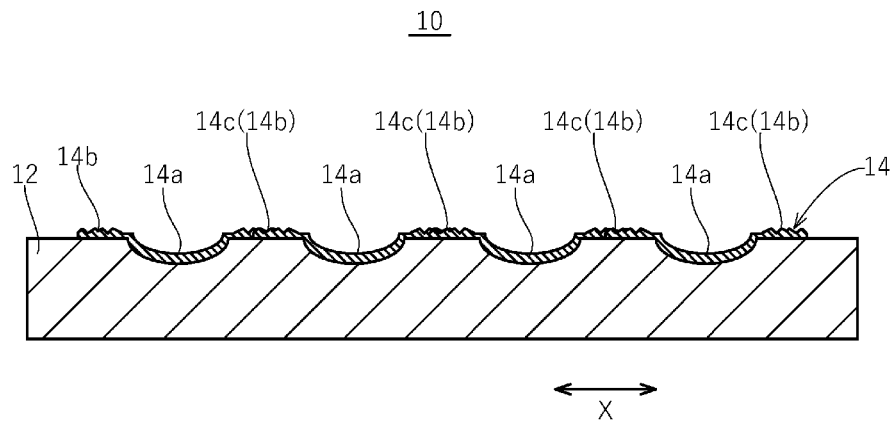
[FIG. 2]
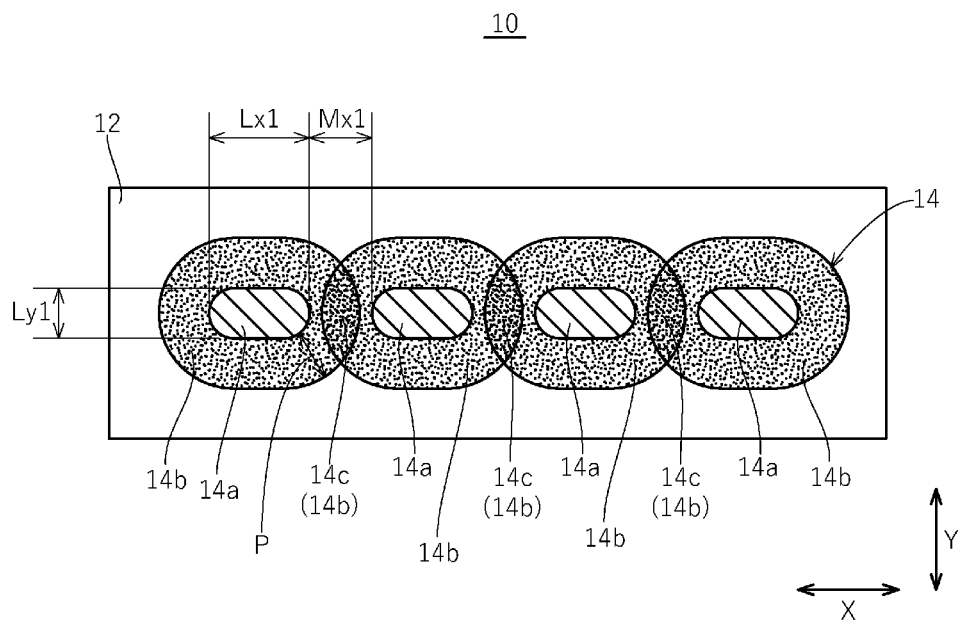

[FIG. 3]
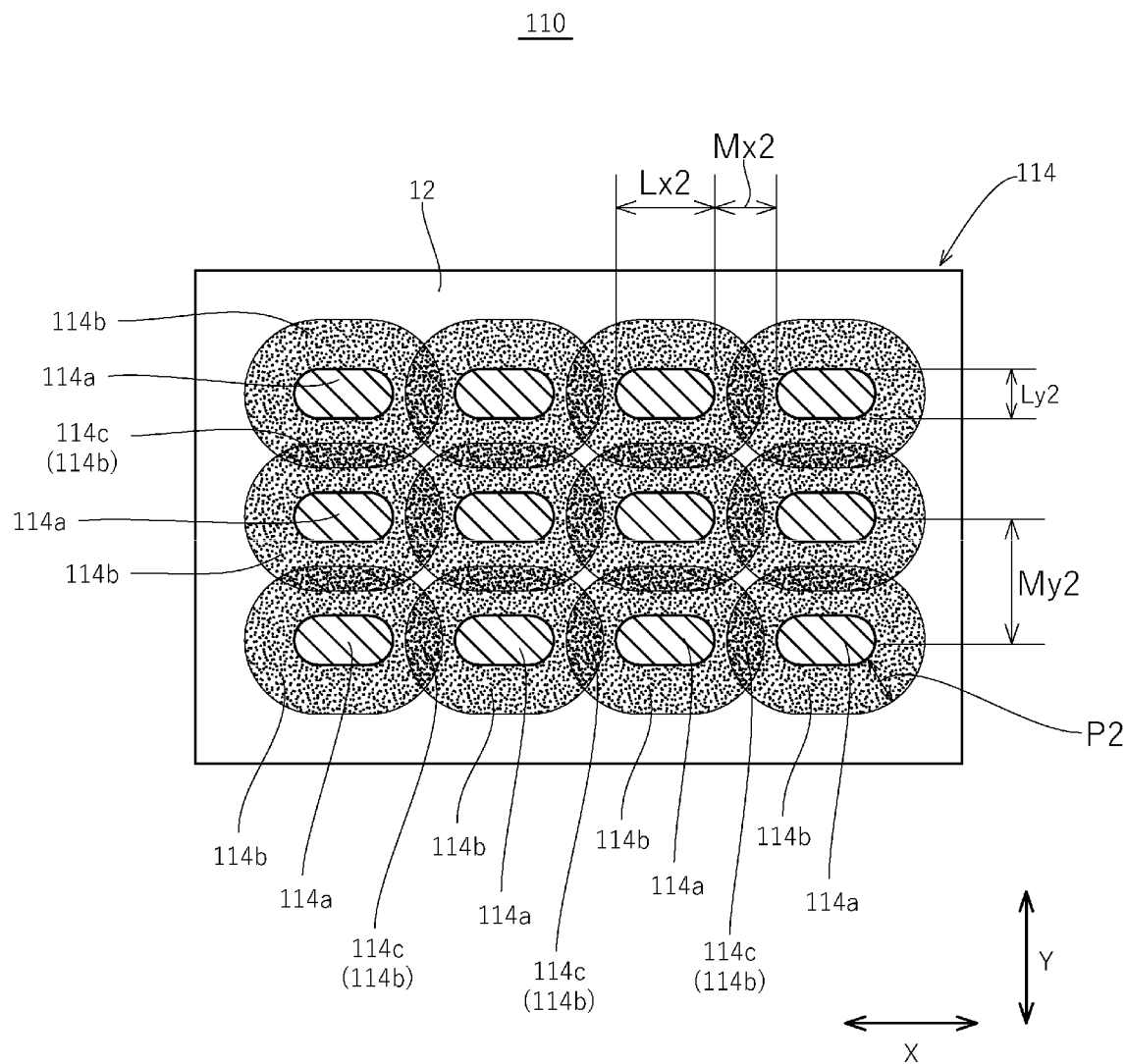

[FIG. 4]
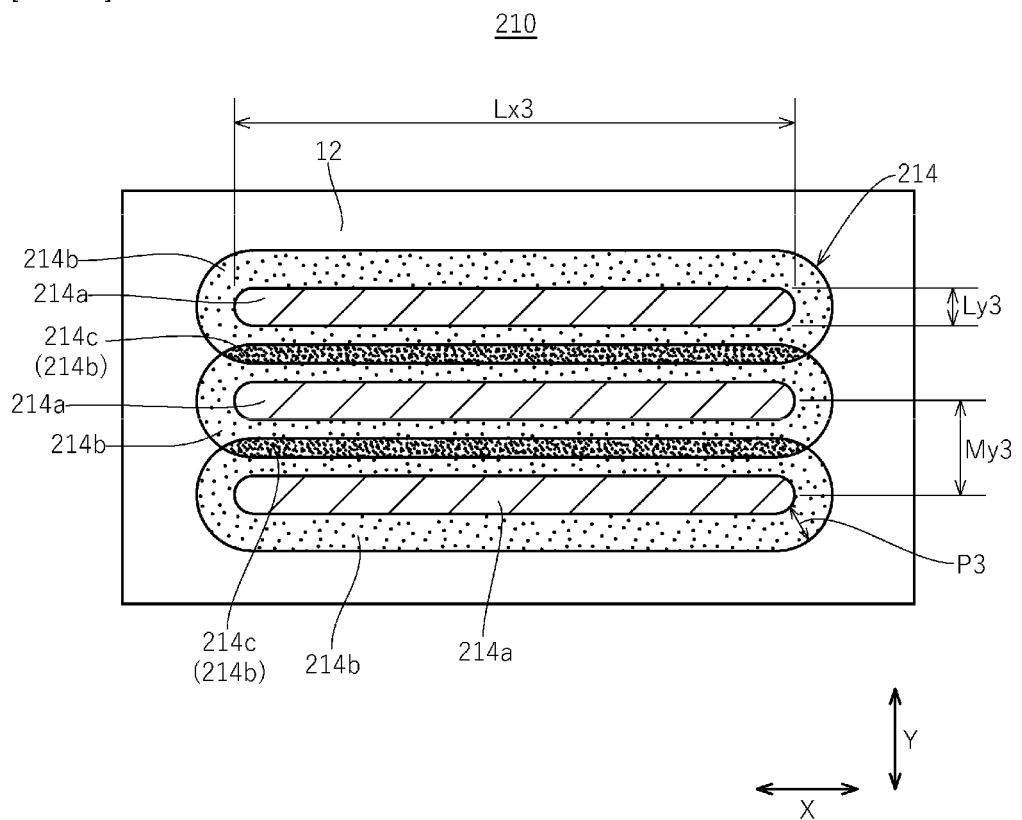

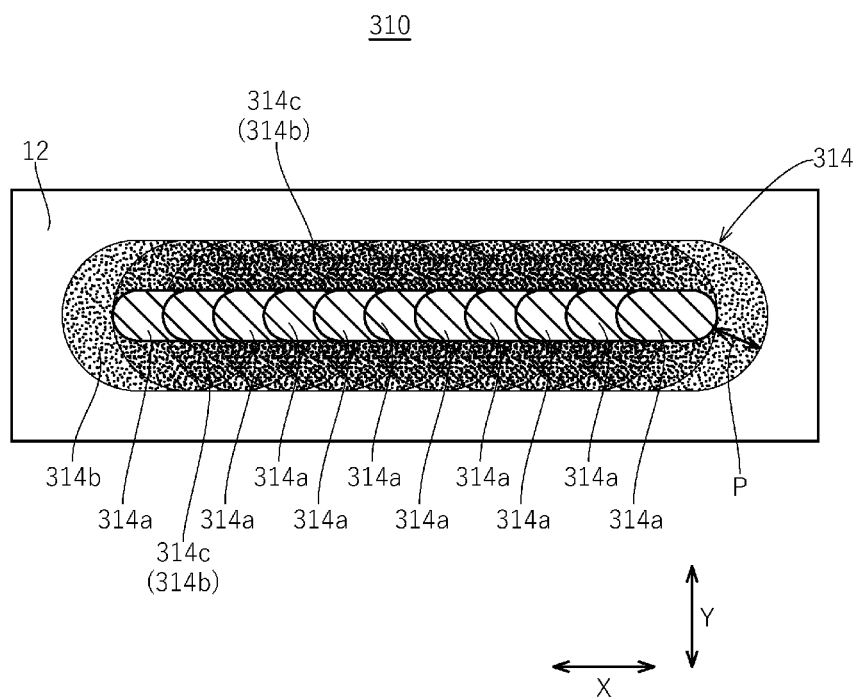

[FIG. 6]
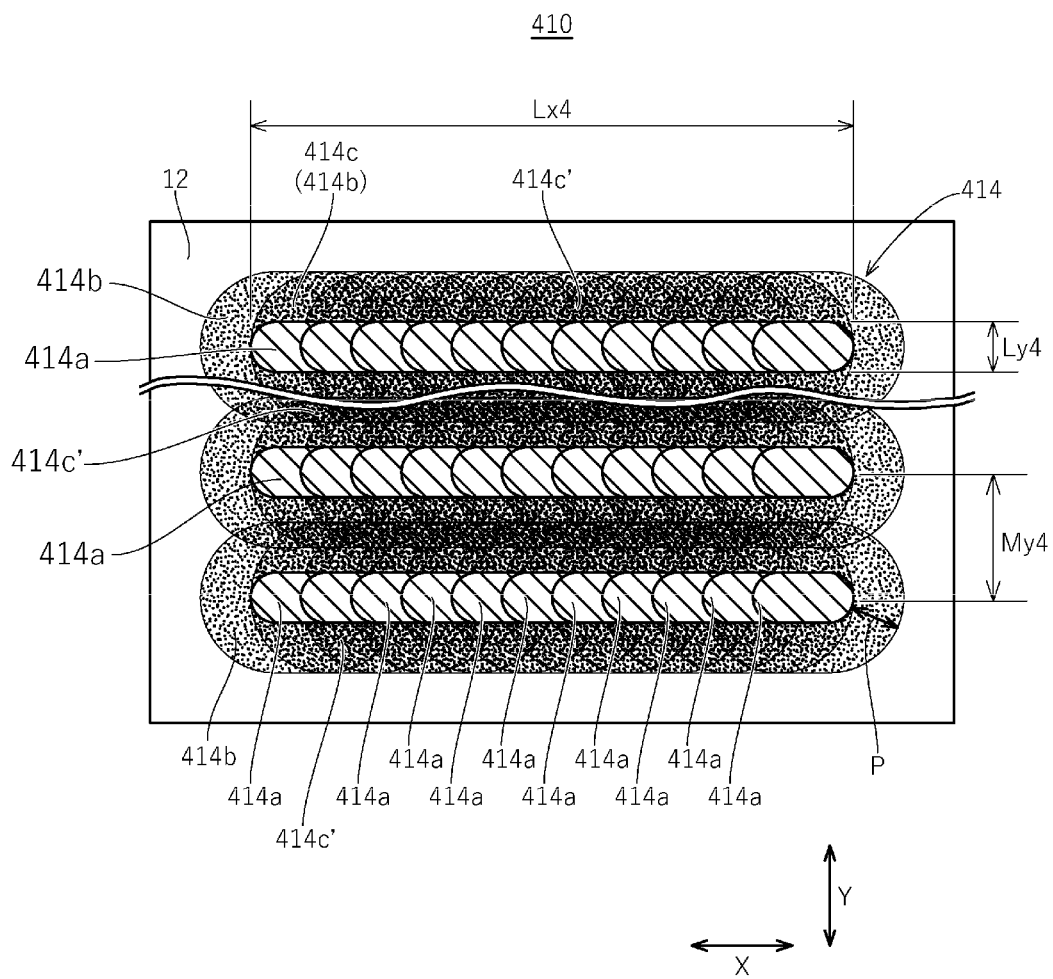

[FIG. 7]
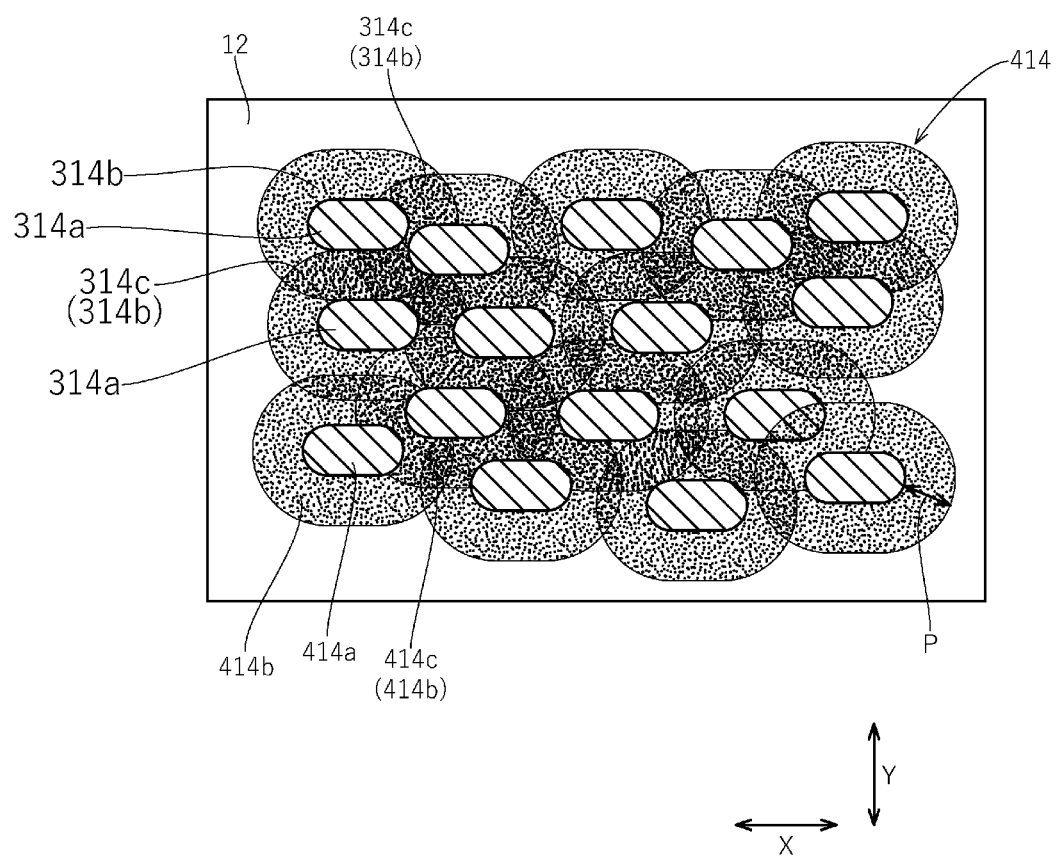

[FIG. 8]
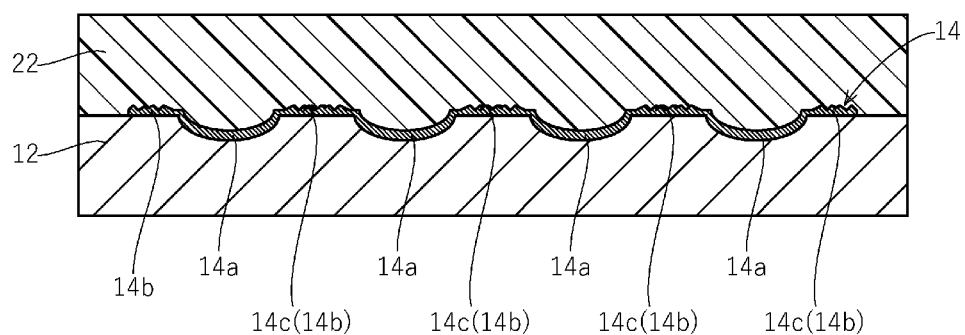
[FIG. 9A]
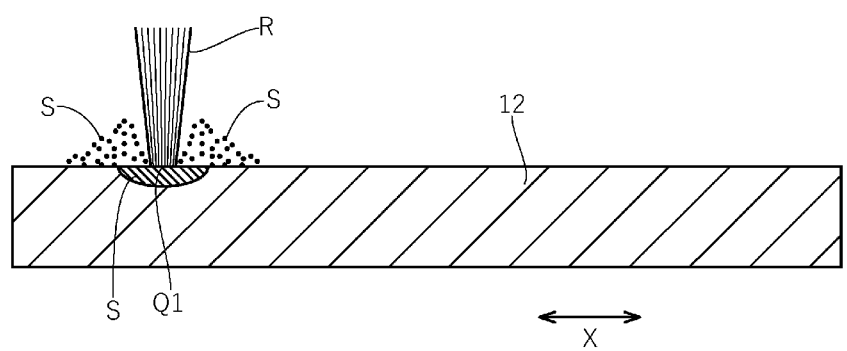

[FIG. 9B]
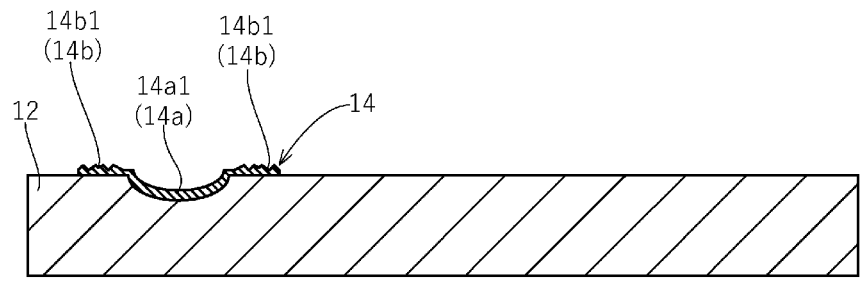
[FIG. 9C]
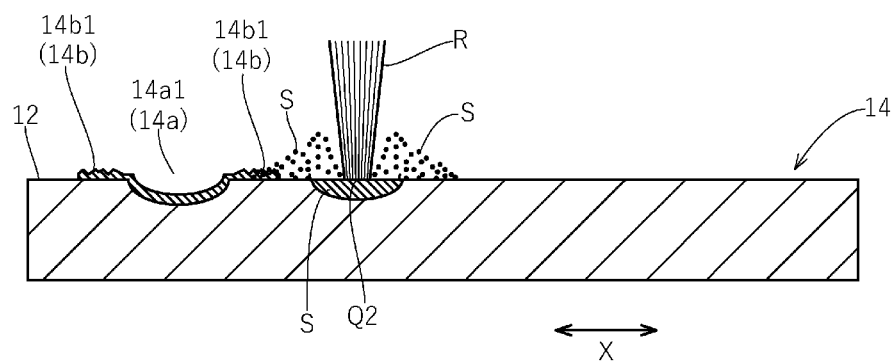
[FIG. 9D]
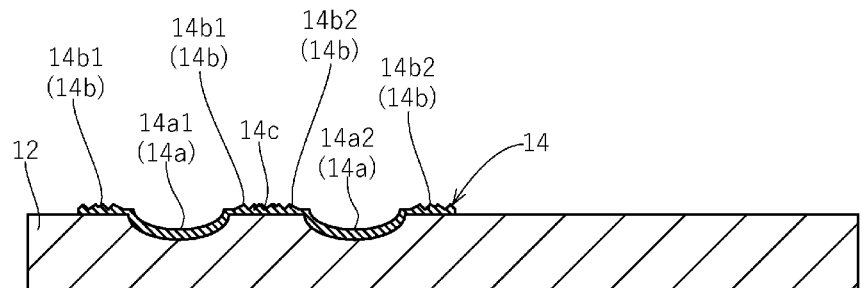

[FIG. 10]
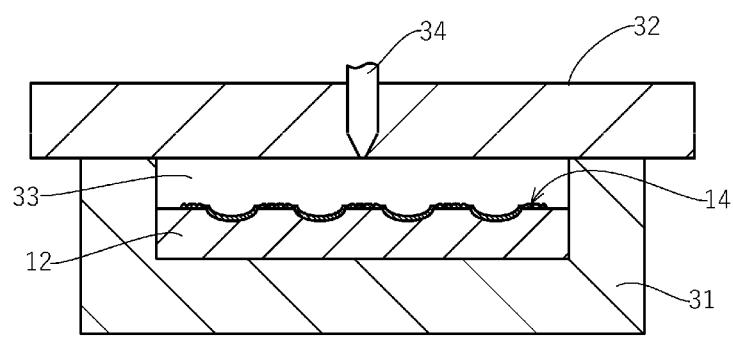
[FIG. 11]
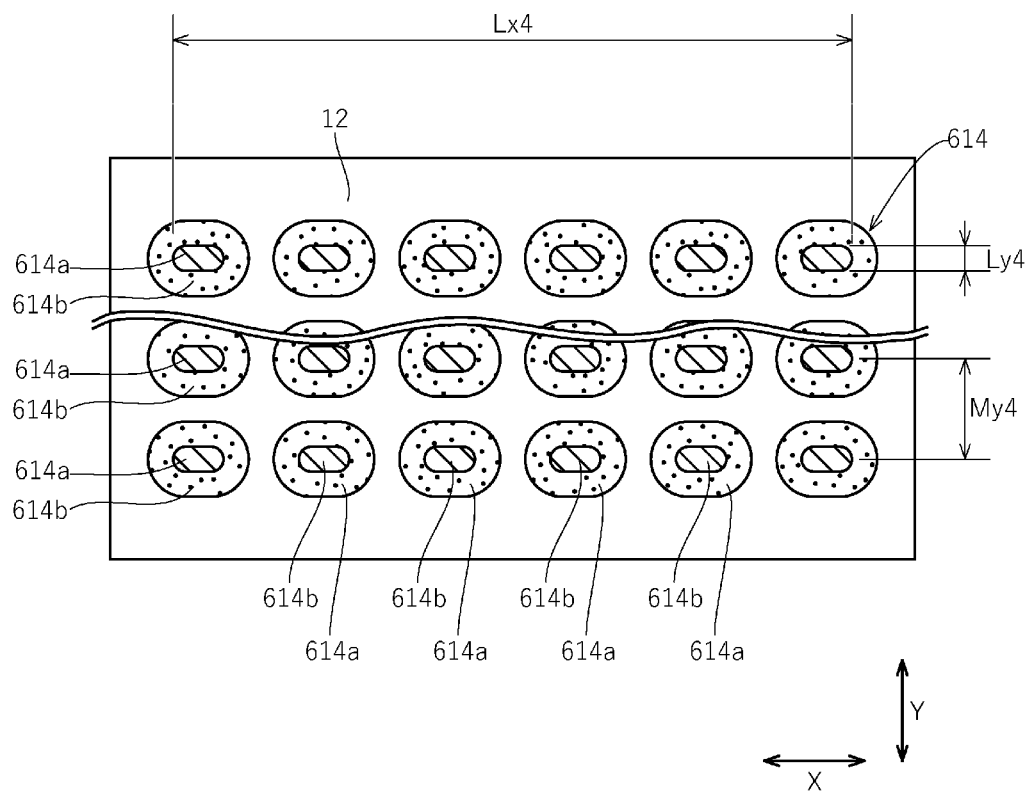

METAL MEMBER, METHOD FOR PRODUCING METAL MEMBER, METAL-RESIN JOINED BODY AND METHOD FOR PRODUCING METAL-RESIN JOINED BODY

TECHNICAL FIELD

The present invention relates to a metal member, a method for producing a metal member, a metal-resin joined body, and a method for producing a metal-resin joined body.

BACKGROUND ART

For example, in PTL 1 and PTL 2, metal-resin joined bodies obtained by joining a metal substrate formed from a metal and a synthetic resin substrate formed from a synthetic resin have been suggested.

In the following PTL 1, it has been suggested to increase the joining strength between a metal substrate and a synthetic resin substrate by bringing a liquid oxidizing agent containing fine air bubbles into contact with the surface of the metal substrate, and forming a reactive group that is capable of hydrogen bonding, phenolic bonding, or ester bonding with the synthetic resin substrate, on the surface of the metal substrate.

In the following PTL 2, it has been suggested to increase the joining strength between a metal substrate and a synthetic resin substrate by forming an oxygen-containing coating film containing oxygen on the surface of the metal substrate, and joining the synthetic resin substrate on this oxygen-containing coating film.

CITATION LIST

Patent Literature

PTL 1: JP-A-2014-60138
PTL 2: International Publication No. 2014/157289

SUMMARY OF THE INVENTION

Technical Problem

The reactive group and the oxygen-containing coating film suggested in PTL 1 and PTL 2 function as a film that assists in the joining between a metal substrate and a synthetic resin substrate on the surface of the metal substrate, and can increase the joining strength between the metal substrate and the synthetic resin substrate. However, there is a strong demand for an increase in the joining strength, and further enhancement is desired.

Meanwhile, in PTL 2, it is disclosed that a joining strength of 40 MPa at the maximum is obtainable. However, in PTL 2, since the joining strength is measured under a load applied in a direction parallel to the joining surface between the metal substrate and the synthetic resin substrate, the effective joining strength is as small as about a half of the measured value, and this is not a sufficient joining strength.

The invention was achieved in view of the problems described above, and it is an object of the invention to provide a metal member that can increase the joining strength between a metal substrate formed from a metal and a synthetic resin substrate formed from a synthetic resin, a metal-resin joined body, and a method for producing a metal-resin joined body.

Solution to Problem

The inventors of the invention conducted a thorough investigation in order to achieve higher joining strength, and the inventors found that increasing the joining strength between a metal substrate and a film that assists in joining, is very useful for the joining of a metal substrate and a synthetic resin substrate. Thus, the inventors completed the invention.

According to the present embodiments, the following aspects of [1] to [18] are provided.

[1] A metal member, including a metal substrate formed from a metal; and an oxide film formed on a surface of the metal substrate by melting of the surface of the metal substrate, in which a joining strength of the oxide film to the metal substrate is 45 MPa or higher as measured by the following method:

<Method> a specimen of type A as defined in ISO19095-2 is produced by joining a PPS resin to the oxide film, and a tensile strength measured according to ISO19095-3 for the specimen thus produced is designated as the joining strength of the oxide film to the metal substrate.

[2] A metal member, including a metal substrate formed from a metal; and an oxide film formed on a surface of the metal substrate, in which the oxide film includes a plurality of molten parts formed by localized melting of the surface of the metal substrate and a plurality of peripheral parts formed around the molten parts by a metal scattered from the molten parts, the plurality of molten parts is provided on the surface of the metal substrate at shifted positions, and the peripheral parts formed around the adjacent molten parts overlap at least partially with one another.

[3] The metal member as described in the above item [1] or [2], in which the surface of the metal substrate in the metal member is coated with a metal having higher ionization tendency than the metal constituting the metal substrate.

[4] A method for producing a metal member having an oxide film formed on a surface of a metal substrate formed from a metal, the method including: a first step of heating the surface of the metal substrate and forming the oxide film on the surface of the metal substrate; and a second step of heating at least a portion of the oxide film and increasing a joining strength of the oxide film to the metal substrate.

[5] The method for producing a metal member as described in the above item [4], in which the oxide film includes molten parts formed by melting of the metal substrate, and peripheral parts formed by scattering of a metal from the molten parts, in the first step, a plurality of the molten parts is formed at shifted positions by localized heating of the surface of the metal substrate, while at the same time, the peripheral parts are formed around the molten parts, and in the second step, at least a portion of the peripheral parts is heated to increase a joining strength of the peripheral parts to the metal substrate.

[6] The method for producing a metal member as described in the above item [5], in which the second step includes a process of heating the peripheral parts already formed on the surface of the metal substrate by thermal conduction, the heating being achieved by the heat supplied to the surface of the metal substrate in the first step.

[7] The method for producing a metal member as described in the above item [6], in which in the first step and the second step, the surface of the metal substrate and the peripheral parts are heated by irradiation with pulsatile laser light.

[8] The method for producing a metal member as described in the above item [7], in which in the first step, the plurality of molten parts is formed at shifted positions so as to overlap with the adjacent molten parts.

[9] The method for producing a metal member as described in any one of the above items [4] to [8], the method further including, before the first step, a pre-process of coating the surface of the metal substrate with a metal having higher ionization tendency than the metal constituting the metal substrate.

[10] A metal-resin joined body, including a metal substrate formed from a metal; the oxide film formed on a surface of the metal substrate; and a synthetic resin substrate formed from a synthetic resin, the synthetic resin substrate being joined to the oxide film, in which the oxide film includes a plurality of molten parts formed by localized melting of the surface of the metal substrate and a plurality of peripheral parts formed around the molten parts by a metal scattered from the molten parts, the plurality of molten parts is provided on the surface of the metal substrate at shifted positions, and the peripheral parts formed around the adjacent molten parts overlap at least partially with one another.

[11] The metal-resin joined body as described in claim 10, in which the surface of the metal substrate is coated with a metal having higher ionization tendency than the metal constituting the metal substrate.

[12] A method for producing a metal-resin joined body having a metal substrate formed from a metal and a synthetic resin substrate formed from a synthetic resin joined together, the method including: a first step of heating a surface of the metal substrate and forming an oxide film on the surface of the metal substrate; a second step of heating at least a portion of the oxide film and increasing a joining strength of the oxide film to the metal substrate; and a third step of joining, after the second step, the synthetic resin substrate to the oxide film.

[13] The method for producing a metal-resin joined body as described in the above item [12], in which the oxide film includes molten parts formed by melting of the metal substrate, and peripheral parts formed by scattering of a metal from the molten parts, in the first step, a plurality of the molten parts is formed at shifted positions by localized heating of the surface of the metal substrate, while at the same time, the peripheral parts are formed around the molten parts, and in the second step, at least a portion of the peripheral parts is heated to increase a joining strength of the peripheral parts to the metal substrate.

[14] The method for producing a metal-resin joined body as described in the above item [13], in which the second step includes a process of heating the peripheral parts already formed on the surface of the metal substrate by thermal conduction, the heating being achieved by the heat supplied to the surface of the metal substrate in the first step.

[15] The method for producing a metal-resin joined body as described in the above item [14], in which in the first step and the second step, the surface of the metal substrate and the oxide film are heated by irradiation with pulsatile laser light.

[16] The method for producing a metal-resin joined body as described in the above item [15], in which in the first step, the plurality of molten parts is formed at shifted positions so as to overlap with the adjacent molten parts.

[17] The method for producing a metal-resin joined body as described in any one of the above items [12] to [16], the method further including, before the first step, a pre-process of coating the surface of the metal substrate with a metal having higher ionization tendency than the metal constituting the metal substrate.

[18] The method for producing a metal-resin joined body as described in any one of the above items [12] to [17], in which the third step includes a process of inserting the metal member into an injection molding mold and injecting a molten synthetic resin toward the oxide film of the inserted metal member inside the injection molding mold.

Advantageous Effects of Invention

In the invention, the joining strength between a metal substrate formed from a metal and a synthetic resin substrate formed from a synthetic resin can be increased.

BRIEF DESCRIPTION OF DRAWINGS

FIG. 1 is a cross-sectional view of a metal member according to an embodiment of the invention.

FIG. 2 is a plan view of the metal member of FIG. 1.

FIG. 3 is a plan view of a metal member according to Modification Example 1.

FIG. 4 is a plan view of a metal member according to another Modification Example 1.

FIG. 5 is a plan view of a metal member according to Modification Example 2.

FIG. 6 is a plan view of a metal member according to another Modification Example 2.

FIG. 7 is a plan view of a metal member according to Modification Example 3.

FIG. 8 is a cross-sectional view of a metal-resin joined body according to an embodiment of the invention.

FIG. 9A is a diagram illustrating a method for producing a metal member according to an embodiment of the invention.

FIG. 9B is a cross-sectional view illustrating an oxide film formed in the process illustrated in FIG. 9A.

FIG. 9C is a diagram illustrating a method for producing a metal member according to an embodiment of the invention.

FIG. 9D is a cross-sectional view illustrating an oxide film formed in the process illustrated in FIG. 9C.

FIG. 10 is a cross-sectional view of an injection molding mold for molding a metal-resin joined body according to an embodiment of the invention.

FIG. 11 is a plan view of a metal member according to Comparative Example.

DESCRIPTION OF EMBODIMENTS

Hereinafter, an embodiment of the invention will be described with reference to the drawings. The invention is not intended to be limited to the following embodiment. The following embodiment is proposed only for illustrative purposes and is not intended to limit the scope of the invention. Novel embodiments can be carried out in various forms other than that, and a variety of omissions, substitutions, and modifications can be carried out to the extent that maintains the gist of the invention. Meanwhile, the thickness of an actual oxide film is thin; however, in order to make the explanation easily understandable, the thickness is described to be larger in the drawings.

(1) Metal Member

The metal member 10 according to an embodiment of the invention is such that a synthetic resin substrate formed from a synthetic resin is joined thereto and constitutes a portion of the metal-resin joined body. This metal member 10 includes, as shown in FIG. 1 and FIG. 2, a metal substrate 12 and an oxide film 14 formed on the surface of the metal substrate 12.

The metal substrate 12 is a member obtained by molding a metal into a predetermined shape such as a block shape, a sheet shape, or a wire shape. Examples of the metal that constitutes the metal substrate 12 include copper (Cu), iron (Fe), aluminum (Al), titanium (Ti) nickel (Ni), and chromium (Cr). The metal substrate 12 may also be composed of an alloy formed from two or more kinds of metals, such as a copper alloy, an iron alloy (steel material), an aluminum alloy, stainless steel, a titanium alloy, or a chromium alloy.

The copper alloy used for the metal substrate 12 is not limited. All copper alloys, such as pure copper-based alloys such as C1020 and C1100 as defined in the Japanese Industrial Standards (JIS H 3000 series); brass alloys such as C2600 series; and copper-nickel-based alloys such as C5600 series, can be used.

Regarding the iron alloy used for the metal substrate 12, for example, iron and steel materials for structural use, such as a cold rolled steel material (SPCC), a hot rolled steel material (SPHC), a hot rolled steel sheet material for automobile structural use (SAPH), a hot rolled high-tension steel sheet material for automobile structural use (SPFH), and steel materials used mainly for machine working (SS materials) can be used. Furthermore, without being limited to the iron alloys described above, all iron and steel materials standardized by the Japanese Industrial Standards (JIS), the International Organization for Standardization (ISO), and the like can be used.

The aluminum alloy used for the metal substrate 12 is not limited. All aluminum alloys such as A1000 series to 7000 series (corrosion-resistant aluminum alloys, high-strength aluminum alloys, heat-resistant aluminum alloys, and the like), which are aluminum alloys for extension as defined in the Japanese Industrial Standards (JIS), and ADC1 to ADC12 types (aluminum alloys for die casting), which are aluminum alloys for casting, can be used.

The stainless steel used for the metal substrate 12 includes Cr-based stainless steel obtained by adding chromium to iron, Cr—Ni-based stainless steel, which is a steel obtained by adding a combination of nickel and chromium, and other known corrosion-resistant alloys called stainless steel. Cr-based stainless steel such as SUS405, SUS429, and SUS403; Cr—Ni-based stainless steel such as SUS301, SUS304, SUS305, and SUS316; and the like, which are standardized by the International Organization for Standardization (ISO), Japanese Industrial Standards (JIS), American Society for Testing and Materials (ASTM), and the like, can be used for the metal substrate 12.

The titanium alloy used for the metal substrate 12 is not limited. All titanium alloys such as a pure titanium-based alloy, an α-form titanium alloy, a β-form titanium alloy, and an α-β-form titanium alloy, which are defined by the International Organization for Standardization (ISO), Japanese Industrial Standards (JIS), and the like, can be used.

Furthermore, the metal substrate 12 is such that the surface of the metal substrate 12 is covered by a coating layer formed from another metal, and an oxide film 14 may be formed on the coating layer. The coating layer that covers the surface of the metal substrate 12 can be formed by methods such as chemical plating, hot dipping, cladding, vapor deposition, and metal spraying. Furthermore, it is preferable that the coating layer is formed from a metal having higher ionization tendency than the metal that constitutes the metal substrate 12.

The shape of the metal substrate 12 can be formed into a desired shape according to the use and the like. Regarding the method for molding the metal substrate 12, any arbitrary method can be applied, and casting of pouring a molten metal or the like into a mold having a desired shape, cutting machining using a machine tool or the like, and punching machining using a press machine or the like, can be used.

The oxide film 14 formed on the surface of the metal substrate 12 has an oxide formed by melting of the surface of the metal substrate 12. That is, the oxide film 14 has an oxide of a metal constituting the metal substrate 12. For example, in a case in which the metal substrate 12 is formed from copper or a copper alloy, the oxide film 14 can contain $Cu_2O$, $CuO$, and the like. In a case in which the metal substrate 12 is formed from iron or an iron alloy, the oxide film 14 contains $FeO$, $Fe_2O_3$, and the like. In a case in which the metal substrate 12 is formed from aluminum or an aluminum alloy, the oxide film 14 can contain $Al_2O_3$ and the like. In a case in which the metal substrate 12 is formed from nickel or a nickel alloy, the oxide film 14 can contain $NiO$ and the like. In a case in which the metal substrate 12 is formed from stainless steel, the oxide film 14 can contain $FeO$, $Fe_2O_3$, $Cr_2O_3$, $CrO_2$, $CrO_3$, and the like. In a case in which the metal substrate 12 is formed from chromium or a chromium alloy, the oxide film 14 can contain $Cr_2O_3$, $CrO_2$, $CrO_3$, and the like. In a case in which the metal substrate 12 is formed from titanium or a titanium alloy, the oxide film 14 can contain $TiO_3$ and the like.

As a preferred embodiment, the oxide film 14 can include a plurality of molten parts 14a formed by localized melting of the surface of the metal substrate 12; and a plurality of peripheral parts 14b formed around the molten parts 14a by a metal scattered from the molten parts 14a.

As shown in FIG. 2, a plurality of molten parts 14a is formed on the surface of the metal substrate 12 at shifted positions in one direction (hereinafter, this direction may be referred to as X-direction). The peripheral parts 14b formed around adjacent molten parts 14a overlap at least partially with one another (the sites where the peripheral parts 14b may be hereinafter referred to as overlapping parts 14c). As shown in FIG. 1, peripheral parts 14b may be formed on a flat surface of the metal substrate 12.

To mention examples of various dimensions with reference to FIG. 2, the length Lx1 in the X-direction of each molten part 14a can be set to 1 μm to 50 μm, the length Ly1 in a direction perpendicular to the X-direction (hereinafter, this direction may be referred to as Y-direction) of the molten part 14a can be set to 1 μm to 50 μm, the interval Mx1 in the X-direction of an adjacent molten part 14a can be set to 20 μm or less, and the distance P1 from the rim of a molten part 14a to the rim of a peripheral part 14b can be set to 10 μm to 100 μm.

In the metal member 10 of the present embodiment as described above, an oxide film 14 is formed on the surface of the metal substrate 12 such that the peripheral parts 14b formed around adjacent molten parts 14a overlap with one another, that is, overlapping parts 14c are formed by a plurality of peripheral parts 14b. At the overlapping parts 14c formed on the surface of the metal substrate 12, the peripheral parts 14b formed on the surface of the metal substrate 12 are first reheated by the heat generated at the time of subsequently forming the molten parts 14a and the peripheral parts 14b. Through this reheating, the peripheral parts 14b have increased joining strength to the metal substrate 12 at the overlapping parts 14c, and the joining strength of the oxide film 14 as a whole to the metal substrate 12 is increased. Therefore, by joining the metal member 10 of the present embodiment to a synthetic resin substrate formed from a synthetic resin on the oxide film 14, a metal-resin joined body having high joining strength can be obtained.

Furthermore, as another preferred embodiment, the oxide film 14 formed on the surface of the metal substrate 12 can have the joining strength to the metal substrate 12 adjusted to be 45 MPa or higher. Here, the joining strength to the metal substrate is the tensile strength obtained by joining a synthetic resin substrate formed from a PPS resin (TORELINA (registered trademark) A673M manufactured by TORAY INDUSTRIES, INC.) to the oxide film 12 to produce a specimen of type A as defined in ISO19095-2, and measuring the tensile strength according to ISO19095-3 for the specimen thus produced.

When the joining strength of the oxide film 14 to the metal substrate 12 measured as described above is 45 MPa or higher, a metal-resin joined body having high joining strength can be obtained by joining a synthetic resin substrate formed from a synthetic resin onto the oxide film 14.

Meanwhile, in regard to the metal member 10 of the present embodiment as described above, a plating layer or a cladding material may be provided on the surface of the metal substrate 12. In that case, it is preferable that a plating layer or a cladding material is formed of a metal having higher ionization tendency than the metal that constitutes the metal substrate. By covering the surface of the metal substrate 12 with a metal having high ionization tendency as such, the oxide film 14 formed on the surface cannot be easily reduced, and durability is enhanced. Particularly, in a case in which the metal that constitutes the metal substrate 12 has higher ionization tendency than hydrogen, such as copper, silver, platinum, palladium, or gold, the oxide film cannot be easily reduced by water, and thus durability is markedly increased.

Modification Example 1

In the embodiment described above, a metal member 10 including an oxide film 14 provided with a plurality of molten parts 14a at an interval in the X-direction such that some of the peripheral parts 14b overlap with one another in the X-direction, has been explained; however, for example, a metal member 110 including an oxide film 114 as show in FIG. 3 is also acceptable. That is, the oxide film 114 includes a plurality of molten parts 114a provided at intervals in the X-direction and the Y-direction; and a plurality of peripheral parts 114b provided around the molten parts 114a. Some of the multiple peripheral parts 114b overlap in the X-direction and the Y-direction and form overlapping parts 114c.

To mention examples of various dimensions with reference to FIG. 3, the length Lx2 in the X-direction of each molten part 114a can be set to 1 μm to 50 μm, the length Ly2 in the Y-direction of the molten part 114a can be set to 1 μm to 50 μm, the interval Mx2 in the X-direction of an adjacent molten part 114a can be set to 20 μm or less, the distance P2 from the rim of a molten part 114a to the rim of a peripheral part 114b can be set to 10 μm to 100 μm, and the interval My2 of the centers of molten parts 114a adjacent in the Y-direction can be set to 10μ to 500 μm.

Furthermore, a metal member 210 including an oxide film 214 as illustrated in FIG. 4 is also acceptable. That is, the oxide film 214 includes a plurality of molten parts 214a spreading out along the X-direction; and a plurality of peripheral parts 214b provided around the molten parts 214a. Molten parts 214a are provided at an interval in the Y-direction such that portions of the multiple peripheral parts 214b overlap in the Y-direction and form overlapping parts 214c.

To mention examples of various dimensions with reference to FIG. 4, the length Lx3 in the X-direction of each molten part 214a can be set to 1 mm to 20 mm, the length Ly3 in the Y-direction of the molten part 214a can be set to 1 μm to 50 μm, the distance P3 from the rim of a molten part 214a to the rim of a peripheral part 214b can be set to 10 μm to 100 μm, and the interval My3 at the centers of molten parts 214a adjacent in the Y-direction can be set to 20μ to 500 μm. Meanwhile, in this case, an end in the X-direction of a molten part 214a adjacent in the Y-direction may be connected with the molten part 214a, or may be separated therefrom.

Also for the metal members 110 and 210 of such a Modification Example, the joining strength to the metal substrate 12 at the overlapping parts 114c and 214c is increased, and the joining strength of the oxide films 114 and 214 as a whole to the metal substrate 12 is increased.

Modification Example 2

In the embodiment described above, a case in which multiple molten parts 14a are formed on the surface of a metal substrate 12 at an interval has been explained; however, as in the case of the metal member 310 illustrated in FIG. 5, a plurality of molten parts 314a may be provided such that portions of molten parts 314a that are adjacent in the X-direction overlap. At that time, it is preferable to provide the molten parts 21 at shifted positions so that half or more of the molten parts 314a overlap in a direction in which the molten parts 314a lie adjacently (X-direction in FIG. 5).

Furthermore, as in the case of the metal member 410 illustrated in FIG. 6, a plurality of molten parts 414a may be provided such that portions of molten parts 414a that are adjacent in the X-direction overlap, and those molten parts 414a may be provided to be aligned in a plurality of rows in the Y-direction. At that time, as in the case of the metal member 310 illustrated in FIG. 5, it is preferable that molten parts 414a are provided at shifted positions such that half or more of the molten parts 414a overlap in a direction in which the molten parts 414a lie adjacently (X-direction in FIG. 6). Furthermore, as illustrated in FIG. 6, in a case in which multiple molten parts 414a are provided to be aligned in a plurality of rows in the Y-direction, it is preferable that multiple molten parts 414a are provided to be aligned in the Y-direction such that portions of peripheral parts 114b overlap in the Y-direction and form overlapping parts 114c.

As in the case of the metal member 310 illustrated in FIG. 5 and the metal member 410 illustrated in FIG. 6, overlapping parts 314c and 414c, in which peripheral parts 314b and 414b formed around molten parts 314a and 414a overlap with one another, can be extensively formed by superposing molten parts 314a and 414a. Therefore, the joining strength of the oxide films 314 and 414 as a whole to the metal substrate 12 is increased.

Particularly, overlapping parts 314c' and 414c', in which peripheral parts 314b and 414b overlap with one another three or more times, can be extensively formed by providing a plurality of molten parts 314a and 414a such that half or more of the molten parts 314a and 414a overlap in a direction in which the molten parts 314a and 414a lie adjacently. At these overlapping parts 314c' and 414c', since the peripheral parts 314b and 414b are reheated several times, the joining strength to the metal substrate 12 is increased, and the joining strength of the oxide films 314 and 414 as a whole to the metal substrate 12 is increased to a large extent.

Modification Example 3

In the embodiment described above, a case in which multiple molten parts 14a are provided to be aligned in a predetermined direction (X-direction or Y-direction) has been explained; however, as in the case of the metal member 410 illustrated in FIG. 7, an oxide film 314 having molten parts 414a scattered on the surface of the metal substrate 12 may be provided to the extent that at least portions of the peripheral parts 414b overlap to form overlapping parts 414c.

(2) Metal-Resin Joined Body

Next, a metal-resin joined body 20 of an embodiment of the invention will be explained on the basis of FIG. 8.

The metal-resin joined body 20 of the present embodiment includes the metal member 10 of the above-described section (1); and a synthetic resin substrate 22 formed from a synthetic resin.

The synthetic resin substrate 22 is a member obtained by molding a synthetic resin into a predetermined shape such as a block shape, a sheet shape, or a wire shape. Furthermore, the synthetic resin substrate 22 may be a coating film of a synthetic resin, or an adhesive layer formed from an adhesive made of a synthetic resin. Regarding the synthetic resin that constitutes the synthetic resin substrate 22, one kind or two or more kinds of resins produced mainly using petroleum as a raw material, such as a thermoplastic resin, a thermoplastic elastomer, or a thermosetting resin, can be used. Specific examples include a polypropylene resin (PP resin), a polyacetal resin (POM resin), a polyphenylene sulfide resin (PPS resin), an acrylonitrile/butadiene/styrene resin (ABS resin), a polyethylene resin (PE resin), a polybutylene terephthalate resin (PBT resin), a polyamide resin (PA resin), an epoxy resin, a liquid crystal polymer (LCP resin), a modified polyphenylene ether resin (modified PPE), and a reactor type soft polypropylene-based resin (metallocene-based reactor type TPO resin). Furthermore, the synthetic resin substrate 22 may be a resin substrate obtained by incorporating a reinforcing material such as carbon fibers, glass fibers, or talc; a flame retardant; a deterioration inhibitor; an elastomer component; or the like into a synthetic resin such as described above.

The synthetic resin substrate 22 is joined to the oxide film 14 formed on the surface of the metal substrate 12 by thermal compression, and constitutes the metal-resin joined body 20 shown in FIG. 8.

In the metal-resin joined body 20 of the present embodiment, as described in the above section (1), an oxide film 14 formed on a metal member 10 is strongly joined to a metal substrate 12. In addition, since the oxide film 14 can easily form chemical bonding with a functional group carried by the resin material, the synthetic resin substrate 22 can be strongly joined to the oxide film 14. Therefore, in the metal-resin joined body 20, the metal substrate 12 and the synthetic resin substrate 22 are strongly joined by means of the oxide film 14.

Modification Example

In the present embodiment, a metal-resin joined body 20 having a synthetic resin substrate 22 joined to the metal member 10 shown in FIG. 1 and FIG. 2 has been explained; however, a metal-resin joined body in which a synthetic resin substrate 22 is joined to the metal member 110 shown in FIG. 3, the metal member 210 shown in FIG. 4, the metal member 310 shown in FIG. 5, the metal member 410 shown in FIG. 6, or the metal member 510 shown in FIG. 7, is also acceptable.

(3) Method for Producing Metal Member

Next, a method for producing the metal member 10 of the above section (1) will be described on the basis of FIG. 9A to FIG. 9D.

The metal member 10 can be obtained by locally heating the surface of the metal substrate 12. In the present embodiment, the surface of the metal substrate 12 is intermittently irradiated with laser light while moving (scanning) the position of irradiation with laser light in the X-direction at a constant speed. That is, the surface of the metal substrate 12 is irradiated with pulsatile laser light. Thereby, a plurality of sites of the surface of the metal substrate 12 is locally heated, and thus an oxide film 12 is formed on the surface of the metal substrate 12.

Specifically, as shown in FIG. 9A, when the surface of the metal substrate 12 is locally heated by irradiating a predetermined position of the surface of the metal substrate 12 with a first laser light R, the metal at the site Q1 irradiated with laser light R melts. The molten metal S takes up oxygen in air and becomes a metal oxide. Furthermore, a portion of the molten metal S scatters around the site Q1 while taking up oxygen in air. When the irradiation of the site Q1 with laser light is completed, the molten metal (metal oxide) is cooled and solidified, and a molten part 14a is formed at the site Q1. Furthermore, a peripheral part 14b is formed around the molten part 14a by the scattered metal (see FIG. 9B).

Since such a peripheral part 14b is a metal oxide formed as molten metal is scattered, the joining strength to the metal substrate 12 is weak.

Meanwhile, hereinafter, a process of irradiating a metal substrate 12 with laser light and thereby forming a molten part 14a and a peripheral part 14b may be referred to as first step, and the molten part 14a and the peripheral part 14b formed by irradiation with a first laser light may be referred to as molten part 14a1 and peripheral part 14b1, while the molten part 14a and the peripheral part 14b formed by n-th (n: an integer of 2 or larger) irradiation with laser light may be referred to as molten part 14an and peripheral part 14bn.

Next, as shown in FIG. 9C, the first laser light is moved over a predetermined distance in the X-direction from the position of irradiating the first laser light, and then the surface of the metal substrate 12 is locally heated by irradiating the surface with a second laser light. The surface of the metal substrate 12 is locally heated by irradiation with this second laser light, and the metal at a site Q2 that has been irradiated with laser light R melts. The molten metal S takes up oxygen in air and becomes a metal oxide. Furthermore, a portion of the molten metal S scatters around the site Q2 while taking up oxygen in air. When the irradiation of the site Q2 with laser light is completed, the molten metal (metal oxide) is cooled and solidified, and a molten part 14a2 is formed at the site Q2. Furthermore, a peripheral part 14b2 is formed around the molten part 14a2 by the scattered metal (see FIG. 9D).

Here, the position irradiated with the second laser light is set so as to form an overlapping part 14c, at which the peripheral part 14b1 formed by irradiation with the first laser light and the peripheral part 14b2 formed by irradiation with the second laser light overlap at least partially with each other. Furthermore, the position irradiated with the second laser light may overlap with a portion of the molten part 14a1 formed by irradiation with the first laser light.

Furthermore, the laser light to be irradiated at each position of the first, second, . . . , and n-th positions may be a single pulse of pulsatile laser light, or may be a plurality of pulses.

Here, in a case in which each position of the first, second, . . . , and n-th positions is irradiated with a single pulse of pulsatile laser light, when the frequency of the laser light is designated as C (Hz), the output power of the laser light as D (W), and the speed of movement of the laser light as E (mm/sec), the speed of movement E of the laser light can be set up so as to satisfy the following Formula 1.

$$E < (10 \times D \times C)^{1/2} \qquad \text{(Formula 1)}$$

By setting the position of irradiation with the second laser light so as to form the overlapping part 14c, the portion positioned at the overlapping part 14c in the peripheral part 14b1 formed by irradiation with the first laser light is reheated by the thermal conduction of the heat generated by irradiation with the second laser light, and the heat of the metal scattered from the molten part 14a2 by irradiation with the second laser light, and the joining strength of the oxide film 14 to the metal substrate 12 is increased. That is, in the present embodiment, the irradiation with the second laser light combines the first step of forming the molten part 14a2 and the peripheral part 14b2; and a process of heating again the peripheral part 14b1 formed by the irradiation with the first laser light and thereby increasing the joining strength to the metal substrate 12 (hereinafter, this process may be referred to as second step).

Subsequently, when the surface of the metal member 10 is intermittently irradiated with laser light while moving the laser light in the X-direction, an oxide film 14 including a plurality of molten parts 14a provided at an interval in the X-direction and a plurality of peripheral parts 14b provided so as to partially overlap with one another in the X-direction, is formed on the surface of the metal substrate 12. Thus, a metal member 10 as shown in FIG. 2 is obtained.

In the present embodiment, as a result of irradiation with the second laser light after thereafter, that is, irradiation with the n-th laser light, the portion positioned at the overlapping part 14c in the peripheral part 14b (n−1) formed by irradiation with the (n−1)-th laser light immediately before is reheated by thermal conduction of the heat generated by irradiation with the n-th laser light and the heat of the metal scattered from the molten part 14an by irradiation with the n-th laser light. Thus, the joining strength of the oxide film 14 to the metal substrate 12 is increased.

Furthermore, in the present embodiment, the surface of the metal substrate 12 is locally heated by irradiating the surface with pulsatile laser light that is obtainable by subjecting a laser to pulsed oscillation. Thus, laser light having high energy can be instantaneously irradiated, compared to the case of irradiating with continuous laser light that is obtainable by subjecting a laser to continuous oscillation. Therefore, in the present embodiment, molten metal is likely to be scattered far from the molten part 14a and in a large quantity, and a peripheral part 14b can be formed extensively around the molten part 14a. Thus, an overlapping part 14c can be extensively formed.

Modification Example 1

In the embodiments described above, cases in which a metal member 10 including an oxide film 14 that spreads out along the X-direction as shown in FIG. 2 is produced by irradiating the surface of a metal substrate 12 with pulsatile laser light while moving the position of irradiation with laser light in the X-direction at a constant speed, have been explained. However, by appropriately setting the pulse width B of laser light, the frequency C of laser light, the output power D of laser light, the speed of movement E of laser light, and the direction of movement of laser light, the metal member 110 shown in FIG. 3, the metal member 210 shown in FIG. 4, the metal member 310 shown in FIG. 5, the metal member 410 shown in FIG. 6, or the metal member 510 shown in FIG. 7 can be produced.

For example, in a case in which the metal member 110 shown in FIG. 3 is produced, first, a plurality of molten parts 114a and a plurality of peripheral parts 114b are formed along the X-direction by intermittently irradiating the surface of a metal substrate 12 with laser light while moving the position of irradiation with laser light toward one side in the X-direction at a constant speed. Subsequently, a plurality of molten parts 114a and a plurality of peripheral parts 114b are formed along the X-direction by moving the position of irradiation with laser light over a distance My2 in the Y-direction and then intermittently irradiating the surface of the metal substrate 12 with laser light while moving the position of irradiation with laser light toward the other side of the X-direction at a constant speed. Subsequently, the movement of the position of laser irradiation in the Y-direction and the formation of a plurality of molten parts 114a and a plurality of peripheral parts 114b are repeated, and thereby the metal member 110 shown in FIG. 3 can be produced.

Meanwhile, the distance My2 over which the position of irradiation with laser light is moved in the Y-direction can be set such that the peripheral parts 114b that are adjacent in the Y-direction overlap at least partially with one another and form the overlapping parts 114c. For example, when the output power of laser light is designated as D (W), and the speed of movement of laser light as E (mm/sec), the distance My2 (mm) can be set up so as to satisfy the following Formula 2.

$$My2 < 10 \times D/E \qquad \text{(Formula 2)}$$

Furthermore, in a case in which the metal member 210 shown in FIG. 4 is produced, the surface of the metal substrate 12 is continuously irradiated with laser light while the position of irradiation with laser light is moved toward one side of the X-direction at a constant speed, and thereby a series of molten parts 214a spreading out along the X-direction and peripheral parts 214b provided around the molten parts 214a are formed. Subsequently, after the position of irradiation with laser light is moved over a predetermined distance My3 in the Y-direction, the surface of the metal substrate 12 is continuously irradiated with laser light while the position of irradiation with laser light is moved toward the other side of the X-direction at a constant speed, and thereby a series of molten parts 214a spreading out along the X-direction and peripheral parts 214b provided around the molten parts 214a are formed. Subsequently, the movement of the position of laser irradiation in the Y-direction and the formation of molten parts 214a and peripheral parts 214b are repeated, and thereby the metal member 210 shown in FIG. 4 can be produced.

Meanwhile, the distance My3 over which the position of irradiation with laser light can be set such that the peripheral parts 214b that are adjacent in the Y-direction overlap at least partially with one another and form overlapping parts 214c. For example, when the output power of laser light is designated as D (W), and the speed of movement of laser light as E (mm/sec), the distance My3 (mm) can be set up so as to satisfy the following Formula 3.

$$My3 < 10 \times D/E \qquad \text{(Formula 3)}$$

In the two Modification Examples described above, oxide films 114 and 214 that are strongly joined to a metal substrate 12 can be formed efficiently and extensively on the surface of the metal substrate 12.

In a case in which the metal member 310 shown in FIG. 5 is produced, the metal member 410 shown in FIG. 5 can be produced by intermittently irradiating the surface of the metal member 10 with pulsatile laser light while moving the laser light is moved in the X-direction such that an n-th laser light partially overlaps with molten parts 414a formed by irradiation with an (n−1)-th laser light.

In a case in which the metal member 410 shown in FIG. 6 is produced, while the metal member 410 is moved in the X-direction as in the case of the metal member 310 shown in FIG. 5, the surface of the metal member 10 is intermittently irradiated with pulsatile laser light, thereby a plurality of molten parts 414a is provided such that molten parts 414a that are adjacent in the X-direction partially overlap, and at the same time, peripheral parts 414b are provided around the molten parts 414a.

Subsequently, after the position of irradiation with laser light is moved over the distance My2 (see Formula 2 described above) in the Y-direction, the surface of the metal substrate 12 is intermittently irradiated with laser light while the position of irradiation with laser light is moved toward the other side of the X-direction, and thereby a plurality of molten parts 414a and peripheral parts 414b are provided such that molten parts 414a that are adjacent in the X-direction partially overlap. Subsequently, the movement of the position of laser irradiation in the Y-direction and the formation of a plurality of molten parts 414a and peripheral parts 414b are repeated, and thereby the metal member 510 shown in FIG. 6 can be produced.

Modification Example 2

In the embodiments described above, a case in which the surface of the metal substrate 12 is irradiated with laser light, and a first step and a second step are carried out has been explained; however, before the first step, that is, a preprocess for providing a coating layer on the surface of the metal substrate 12 is carried out by a method such as chemical plating, melt plating, cladding, vapor deposition, or metal spraying, and subsequently the first step and the second step are carried out. Thus, an oxide film 14 may be formed on the plating layer or the like.

Modification Example 3

In the embodiments described above, a case in which the surface of the metal substrate 12 is locally heated by irradiating the surface with laser light has been explained; however, the method of locally heating the surface of the metal substrate 12 is not particularly limited, and for example, the oxide film 14 may also be formed by locally heating the surface of the metal substrate 12 by high-frequency induction heating or resistant heating, or by combining several of these heating methods.

Modification Example 4

In the embodiments described above, a case in which a first step of forming new molten parts 14a and peripheral parts 14b also serves as a second step of reheating the peripheral parts 14b that have already been formed on the surface of the metal substrate 12, has been explained; however, the peripheral parts 14b that have already been formed may be reheated by irradiating again with laser light, or the peripheral parts 14b that have already been formed may be reheated by high-frequency induction heating or resistant heating, without forming new molten parts 14a and peripheral parts 14b.

(4) Method for Producing Metal-Resin Joined Body

Next, a method for producing a metal-resin joined body 20 as shown in FIG. 8 will be explained.

A metal-resin joined body 20 is obtained by performing a process of joining the synthetic resin substrate 22 of the above section (2) to the oxide film 14 of the metal member 10 produced by the method of the above section (3) by thermal compression, injection molding, or the like (hereinafter, this process may be referred to as third step).

According to the present embodiment, in the third step, as shown in FIG. 10, the metal member 10 having the oxide film 14 formed thereon is inserted into an injection molding mold 30, a molten synthetic resin material is injected toward the oxide film 14 inside the injection molding mold 30, and thereby a synthetic resin substrate 22 is joined to the metal member 10.

The injection molding mold 30 includes a lower mold 31, an upper mold 32, and a cavity 33 formed between the lower mold 31 and the upper mold 32, and a molten resin material is injected into the cabinet 33 through an injection port 34 provided in the upper mold 32.

In the lower mold 31, the metal member 10 is disposed (inserted) such that the oxide film 14 faces the cavity 33, subsequently the upper mold 32 is closed, and a molten resin material is injected into the cavity 33 through the injection port 34. Then, the molten resin material is injection molded toward the oxide film 14. Thereby, when the synthetic resin substrate 22 is molded inside the cavity 33, the oxide film 14 on the metal substrate 12 and the synthetic resin substrate 22 are simultaneously joined, and thus a metal-resin joined body 20 is obtained.

In the present embodiment, since an oxide film 14 that is strongly joined to the surface of the metal substrate 12 can be formed by reheating of the oxide film 14, the metal substrate 12 and the synthetic resin substrate 22 can be strongly joined.

Modification Example

In the present embodiment, a case in which a metal-resin joined body 20 is produced by joining a synthetic resin substrate 22 to the metal member 10 shown in FIG. 1 has been explained; however, the metal-resin joined body may also be produced by joining the synthetic resin substrate 22 to the oxide film 114 of the metal member 110 shown in FIG. 3, joining the synthetic resin substrate 22 to the oxide film 214 of the metal member 210 shown in FIG. 4, joining the synthetic resin substrate 22 to the oxide film 314 of the metal member 310 shown in FIG. 5, joining the synthetic resin substrate 22 to the oxide film 414 of the metal member 410 shown in FIG. 6, or joining the synthetic resin substrate 22 to the oxide film 514 of the metal member shown in FIG. 7.

(5) Evaluation of Metal-Resin Joined Body

In order to specifically disclose the constitutions and effects of the embodiments described above, metal-resin joined bodies (specimens) of Examples 1 to 16 and Comparative Examples 1 to 4 were produced according to the production method of the above section (4), and a performance evaluation was carried out. Meanwhile, the shape and the size of each of the metal-resin joined bodies thus produced are similar to the specimen of type A (Butt welded test specimens) as defined in ISO19095-2. Radiation of laser light was performed using a laser marker, MD-X1500 (manufactured by KEYENCE CORPORATION, laser type: $YVO_4$ laser, wavelength: 1,064 nm).

Examples 1 to 16 are Examples in which a synthetic resin substrate 22 is joined to the metal member 210 having an oxide film 414 provided on the surface of a metal substrate 12 as shown in FIG. 6. Meanwhile, in Examples 1 to 16, a plurality of molten parts 414a spreading out along the X-direction is provided by aligning the molten parts 414a in 17 rows in the Y-direction.

Meanwhile, Examples 11 and 14 had tin (Sn) plating provided on the surface of a metal substrate formed from copper (C1100); Example 12 had nickel (Ni) plating provided on the surface of a metal substrate formed from iron (SPCC); Example 13 had nickel (Ni) plating provided on the surface of a metal substrate formed from copper (C1100); and Example 16 had an alumite treatment provided on the surface of a metal substrate formed from Al (A1050).

Comparative Example 1 is an example in which no oxide film is present on the surface of the metal substrate, and a synthetic resin substrate was directly joined to the surface of a metal substrate.

Comparative Example 2 is an example in which a synthetic resin substrate 22 was joined to a metal member 610 having an oxide film 614 provided on the surface of a metal substrate 12 as shown in FIG. 11. That is, Comparative Example 2 was such that the oxide film constituting the metal member included a plurality of molten parts 614a provided at an interval in the X-direction and the Y-direction, and a plurality of peripheral parts 614b provided around the molten parts 614a; however, adjacent peripheral parts 614b did not overlap in the X-direction and the Y-direction. A resin material was joined to such a metal member 610, and thus a metal-resin joined body of Comparative Example 2 was obtained. Meanwhile, in Comparative Example 2, the molten parts 614a and the peripheral parts 614b were provided by aligning them in 17 rows in the Y-direction.

In Comparative Examples 3 and 4, an oxide film was formed by irradiating the surface of a metal substrate with laser light under the same conditions as in Examples 1 and 2, subsequently the surface of the metal member where the oxide film had been formed was cleaned to remove the oxide film, and a metal member was obtained. Meanwhile, surface unevenness was formed together with the oxide film on the surface of the metal substrate as a result of irradiation with laser light; however, the oxide film was removed by impairing the surface unevenness formed on the surface of the metal substrate. A resin material was joined to the metal member thus obtained, and metal-resin joined bodies of Comparative Examples 3 and 4 were obtained. The cleaning liquid used in Comparative Example 3 was S-PURE SJ400 (manufactured by SASAKI CHEMICAL CO., LTD.), and the cleaning liquid used in Comparative Example 4 was an aqueous solution of sulfuric acid (10 wt %).

Various dimensions of the oxide films of Examples 1 to 16 and Comparative Example 2, and the conditions for laser irradiation in Examples 1 to 16 and Comparative Examples 2 to 4 were as shown in Tables 1 and 2.

Furthermore, in Examples 1 to 16 and Comparative Examples 1 to 4, the materials that constituted the metal substrates and synthetic resin substrates used in the metal-resin joined bodies, and the conditions for injection molding at the time of joining the synthetic resin substrate to the metal member were as shown in the following Tables 1 and 2. The details of the various components of the resin materials in Tables 1 and 2 are as follows.

PPS resin: TORELINA (registered trademark) A673M manufactured by TORAY INDUSTRIES, INC.
LCP resin: Polyplastics Co., Ltd., LAPEROS (registered trademark) E525T
POM resin: Polyplastics Co., Ltd., DURACON (registered trademark) M90-57
Modified PPE resin: Asahi Kasei Corp., XYRON EV103
PP resin: Japan Polypropylene Corporation, WINTEC WMH02
TPO resin: Japan Polypropylene Corporation, WELNEX RFX4V For the metal-resin joined bodies of Examples 1 to 16 and Comparative Examples 1 to 4, the following (a) and (b) were evaluated; for the metal-resin joined body of Example 2, the following (c) was evaluated; and for the metal-resin joined bodies of Examples 2 and 16, the following (d) was evaluated. Specific evaluation methods are as follows.

(a) Measurement of Joining Strength

For the metal-resin joined bodies of Examples 1 to 16 and Comparative Examples 1 to 4, the tensile strength was measured according to ISO19095-3 using a precision universal testing machine, AUTOGRAPH (manufactured by SHIMADZU CORPORATION: AG-1).

(b) Fracture Morphology

In regard to Examples 1 to 16 and Comparative Examples 1 to 4, fracture sites were visually observed after the measurement of the joining strength, and an evaluation was performed to see whether the fracture was a fracture that occurred at the interface between the metal substrate and the oxide film (membrane peeling), a fracture that occurred within the synthetic resin substrate (resin fracture), or a fracture that occurred at the interface between the metal substrate and the synthetic resin substrate (interfacial fracture).

(c) Heat Shock Test

For the metal-resin joined body of Example 2, 1,000 cycles of a heating-cooling process were performed using a thermal shock apparatus (manufactured by ESPEC CORP.: TSA71S-A), and then the joining strength was measured by the method of the above section (a). Meanwhile, a heating-cooling process of heating for 0.5 hours at 120° C., subsequently lowering the temperature to −40° C., cooling for 0.5 hours, and then raising the temperature to 120° C. again, was designated as one cycle.

(d) Water Resistance Test

The metal-resin joined bodies of Examples 2 and 16 were left to stand for 10 hours in an atmosphere saturated with water vapor at a temperature of 113° C. and a gauge pressure of 59 kPa, and then the joining strength was measured by the method of the above section (a).

The results are as shown in Table 1 and Table 2.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Material | Metal substrate | SUS304 | Cu (C1100) | Al (A1050) | Fe (SPCC) | SUS304 | Cu (C1100) | Al (A1050) | SUS304 | Al (A1050) | Al (A1050) |
| | Coating layer | — | — | — | — | — | — | — | — | — | — |
| | Resin substrate | PPS | PPS | PPS | PPS | LCP | LCP | LCP | LCP | POM | PP | TOP |
| Shape of oxide film | | FIG. 4 | FIG. 4 | FIG. 4 | FIG. 4 | FIG. 4 | FIG. 4 | FIG. 4 | FIG. 4 | FIG. 4 | FIG. 4 |
| Conditions for laser | Frequency C (Hz) | 10000 | 10000 | 10000 | 10000 | 10000 | 10000 | 10000 | 10000 | 10000 | 10000 |
| | Output power (W) | 10 | 10 | 10 | 10 | 10 | 10 | 10 | 10 | 10 | 10 |
| | Speed of movement (mm/sec) | 10 | 10 | 10 | 10 | 10 | 10 | 10 | 10 | 10 | 10 |
| Dimension of oxide film | Lx4 (mm) | 10 | 10 | 10 | 10 | 10 | 10 | 10 | 10 | 10 | 10 |
| | Ly4 (μm) | 5 | 5 | 5 | 5 | 5 | 5 | 5 | 5 | 5 | 5 |
| | My4 (μm) | 125 | 125 | 125 | 125 | 125 | 125 | 125 | 125 | 125 | 125 |
| Conditions for injection molding | Temperature of injection molding mold (° C.) | 130 | 130 | 130 | 130 | 130 | 130 | 130 | 130 | 130 | 130 |
| | Injection rate (mm/s) | 10 | 10 | 10 | 10 | 10 | 10 | 10 | 10 | 10 | 10 |
| | Retention pressure (MPa) | 60 | 60 | 60 | 60 | 60 | 60 | 60 | 60 | 60 | 60 |
| | Resin temperature (° C.) | 320 | 320 | 320 | 320 | 320 | 320 | 320 | 320 | 320 | 320 |
| Joining strength (MPa) | | 51.5 | 48.8 | 51.5 | 45.4 | 13.1 | 8.3 | 8.5 | 16.6 | 26 | 9 |
| Fracture morphology | | Resin fracture | Resin fracture | Resin fracture | Resin fracture | Resin fracture | Resin fracture | Resin fracture | Resin fracture | Resin fracture | Resin fracture |
| Heat shock (MPa) | | — | 37.8 | — | — | — | — | — | — | — | — |
| Water resistance (MPa) | | — | 14.3 | — | — | — | — | — | — | — | — |

TABLE 2

| | | Example | | | | | | Comparative Example | | | |
|---|---|---|---|---|---|---|---|---|---|---|---|
| | | 11 | 12 | 13 | 14 | 15 | 16 | 1 | 2 | 3 | 4 |
| Material | Metal substrate | Cu (C1100) | Fe (SPCC) | Cu (C1100) | Cu (C1100) | Ti (TP270H) | Al (A1050) | SUS304 | SUS304 | SUS304 | Cu (C1100) |
| | Coating layer | Sn plating | Ni plating | Ni plating | Sn plating | — | Alumite | — | — | — | — |
| | Resin substrate | Modified PPE | Modified PPE | PPS | PPS | PPS | PPS | PPS | PPS | PPS | PPS |
| Shape of oxide film | | FIG. 4 | FIG. 4 | FIG. 4 | FIG. 4 | FIG. 4 | FIG. 4 | None | FIG. 8 | None | None |
| Conditions for laser | Frequency C (Hz) | 10000 | 10000 | 10000 | 10000 | 10000 | 10000 | — | 20000 | 10000 | 10000 |
| | Output power (W) | 10 | 10 | 10 | 10 | 10 | 10 | — | 10 | 10 | 10 |
| | Speed of movement (mm/sec) | 10 | 10 | 10 | 10 | 10 | 10 | — | 1000 | 10 | 10 |
| Dimension of oxide film | Lx4 (mm) | 10 | 10 | 10 | 10 | 10 | 10 | — | 10 | — | — |
| | Ly4 (μm) | 5 | 5 | 5 | 5 | 5 | 5 | — | 5 | — | — |
| | My4 (μm) | 125 | 125 | 125 | 125 | 125 | 125 | — | 125 | — | — |
| Conditions for injection molding | Temperature of injection molding mold (° C.) | 130 | 130 | 130 | 130 | 130 | 130 | 130 | 130 | 130 | 130 |
| | Injection rate (mm/s) | 10 | 10 | 10 | 10 | 10 | 10 | 10 | 10 | 10 | 10 |
| | Retention pressure (MPa) | 60 | 60 | 60 | 60 | 60 | 60 | 60 | 60 | 60 | 60 |
| | Resin temperature (° C.) | 320 | 320 | 320 | 320 | 320 | 320 | 320 | 320 | 320 | 320 |
| Joining strength (MPa) | | 22.8 | 21.7 | 45.4 | 45.9 | 47.8 | 49.7 | 0 | 10 | 9 | 11.1 |
| Fracture morphology | | Resin fracture | Resin fracture | Resin fracture | Resin fracture | Resin fracture | Resin fracture | Interfacial fracture | Membrane peeling | Interfacial fracture | Interfacial fracture |
| Heat shock (MPa) | | — | — | — | — | — | — | — | — | — | — |
| Water resistance (MPa) | | — | — | 30.8 | 30.8 | — | — | — | — | — | — |

In Comparative Example 1, since an oxide film formed by melting did not exist on the surface of the metal substrate, the metal substrate was not joined to the synthetic resin substrate.

In Comparative Example 2, fracture occurred at the interface between the metal substrate and the oxide film such that the oxide film was peeled off from the metal substrate under a tensile load of 10 MPa. In Comparative Example 2, an oxide film formed by melting was present on the surface of the metal substrate. However, a plurality of peripheral parts provided around the melting parts did not overlap with one another, and the peripheral parts were not reheated. Therefore, the joining strength of the oxide film to the metal substrate was low.

In Comparative Examples 3 and 4, fracture occurred at the interface between the metal substrate and the synthetic resin substrate under a tensile load of 9 MPa and 11.1 MPa, respectively. In Comparative Examples 3 and 4, the surface of the metal member is cleaned after being irradiated with laser light, and thus an oxide film does not exist on the surface of the metal substrate. However, surface unevenness is formed on the surface of the metal substrate as a result of irradiation with laser light. The metal substrate and the synthetic resin substrate were joined by means of an anchor effect brought by this surface unevenness; however, the joining strength was low.

In Examples 1 to 16, the oxide film was not peeled off from the metal substrate, and the synthetic resin substrate fractured in all cases.

In Examples 1, 2, 3, 4, and 13 to 16 in which a synthetic resin substrate formed from a PPS resin and a metal substrate were joined, the oxide film formed on the surface of the metal substrate was not peeled off even under a tensile load of 45 MPa or higher in all cases. Furthermore, in these Examples, the synthetic resin substrate fractured before the oxide film was peeled off. From the above results, it was found that with regard to a metal substrate formed from stainless steel, copper, aluminum, iron, and titanium; a metal substrate obtained by subjecting the surface of copper to nickel plating or tin plating; or a metal substrate obtained by subjecting the surface of aluminum to an alumite treatment, an oxide film formed on each of the metal substrate was joined to the metal substrate with a strength of at least 45 MPa or higher.

Furthermore, in Example 2, the joining strength after a heat shock test became 77.5% of the value before the test, and high joining strength was maintained. Meanwhile, it is thought that the decrease in the joining strength caused by the heat shock test is caused by a decrease in the strength of the synthetic resin substrate (PPS resin).

Furthermore, in a case in which the metal substrate was copper (C1100), in Example 2 in which a plating layer was not provided on the surface of the metal substrate, the joining strength decreased from 48.8 MPa to 14.3 MPa before and after a water resistance test, and the joining strength after the water resistance test became 29.3% of the value before the test. Meanwhile, in Example 13 in which the plating layer was provided on the surface of the metal substrate, the joining strength decreased from 45.4 MPa to 30.8 MPa before and after the water resistance test, and the joining strength after the water resistance test became 67.8% of the value before the test. Thus, water resistance increased to a large extent compared to Example 2 in which a plating layer was not provided.

REFERENCE SIGNS LIST

10 Metal member
12 Metal substrate
14 Oxide film
14a Molten part
14b Peripheral part
14c Overlapping part
20 Joined body
22 Synthetic resin substrate
30 Injection molding mold
31 Lower mold
32 Upper mold
33 Cavity
34 Injection port
110 Metal member
114 Oxide film
114a Molten part
114b Peripheral part
210 Metal member
214 Oxide film
214a Molten part
214b Peripheral part

The invention claimed is:

1. A metal member, comprising a metal substrate formed from a metal; and an oxide film formed on a surface of the metal substrate,
   wherein the oxide film includes a plurality of molten parts formed by localized melting of the surface of the metal substrate and solidifying of the localized melted surface of the metal substrate, and a plurality of peripheral parts formed around the molten parts by a metal scattered from the molten parts and solidifying the metal scattered around the molten parts,
   the plurality of molten parts is provided on the surface of the metal substrate at shifted positions in a first direction,
   the plurality of molten parts are spaced apart from each other at an interval of 10 to 500 μm in a second direction that is perpendicular to the first direction measured from the centers of the molten parts, and
   the peripheral parts formed around the adjacent molten parts overlap at least partially with one another.

2. The metal member according to claim 1, wherein the surface of the metal substrate is coated with a metal having higher ionization tendency than the metal constituting the metal substrate.

3. A metal-resin joined body, comprising a metal substrate formed from a metal; an oxide film formed on a surface of the metal substrate; and a synthetic resin substrate formed from a synthetic resin, the synthetic resin substrate being joined to an oxide film,
   wherein the oxide film includes a plurality of molten parts formed by localized melting of the surface of the metal substrate and solidifying of the localized melted surface of the metal substrate, and a plurality of peripheral parts formed around the molten parts by a metal scattered from the molten parts and solidifying the metal scattered around the molten parts,
   the plurality of molten parts is provided on the surface of the metal substrate at shifted positions in a first direction,
   the plurality of molten parts are spaced apart from each other at an interval of 10 to 500 μm in a second direction that is perpendicular to the first direction measured from the centers of the molten parts, and
   the peripheral parts formed around the adjacent molten parts overlap at least partially with one another.

4. The metal-resin joined body according to claim 3, wherein the surface of the metal substrate is coated with a metal having higher ionization tendency than the metal constituting the metal substrate.

5. The metal member according to claim 1, wherein the peripheral parts are formed on a flat surface of the metal substrate.

6. The metal-resin joining body according to claim 3, wherein the peripheral parts are formed on a flat surface of the metal substrate.

* * * * *